US011745816B2

(12) United States Patent
Treadway et al.

(10) Patent No.: US 11,745,816 B2
(45) Date of Patent: Sep. 5, 2023

(54) ELECTRIC VEHICLE WITH ONE OR MORE CAMERAS

(71) Applicant: Acton, Inc., Livermore, CA (US)

(72) Inventors: Peter Treadway, Livermore, CA (US); Andrew Tam, Livermore, CA (US)

(73) Assignee: Acton, Inc., Livermore, CA (US)

( * ) Notice: Subject to any disclaimer, the term of this patent is extended or adjusted under 35 U.S.C. 154(b) by 0 days.

(21) Appl. No.: 17/314,066

(22) Filed: May 7, 2021

(65) Prior Publication Data

US 2021/0371027 A1    Dec. 2, 2021

Related U.S. Application Data

(60) Provisional application No. 63/030,927, filed on May 28, 2020.

(51) Int. Cl.
| | |
|---|---|
| *B62H 5/08* | (2006.01) |
| *B62H 5/20* | (2006.01) |
| *B62J 45/20* | (2020.01) |
| *H04N 7/18* | (2006.01) |
| *G06V 40/16* | (2022.01) |
| *B62K 3/00* | (2006.01) |
| *B62M 7/12* | (2006.01) |
| *B62J 43/16* | (2020.01) |
| *B62J 43/20* | (2020.01) |
| *B62J 43/30* | (2020.01) |

(52) U.S. Cl.
CPC ............ *B62H 5/08* (2013.01); *B62H 5/20* (2013.01); *B62J 43/16* (2020.02); *B62J 43/20* (2020.02); *B62J 43/30* (2020.02); *B62J 45/20* (2020.02); *B62K 3/002* (2013.01); *B62M 7/12* (2013.01); *G06V 40/161* (2022.01); *G06V 40/168* (2022.01); *H04N 7/18* (2013.01)

(58) Field of Classification Search
CPC ...................................................... B62H 5/08
See application file for complete search history.

(56) References Cited

U.S. PATENT DOCUMENTS

| | | | |
|---|---|---|---|
| 6,400,835 B1 * | 6/2002 | Lemelson ............ | G06V 40/161 382/118 |
| 10,419,904 B2 * | 9/2019 | Lee .......................... | B62J 45/20 |
| 10,523,904 B2 * | 12/2019 | Mahmoud ............ | H04N 23/667 |
| 11,042,766 B2 * | 6/2021 | Kim ...................... | G06N 3/0454 |
| 2019/0248439 A1 * | 8/2019 | Wang ..................... | B62K 11/10 |

(Continued)

FOREIGN PATENT DOCUMENTS

| | | | | |
|---|---|---|---|---|
| CN | 100543602 C | * | 9/2009 | ......... H04N 1/00347 |
| CN | 103888722 A | * | 6/2014 | |

(Continued)

*Primary Examiner* — Kevin Hurley
*Assistant Examiner* — Hosam Shabara
(74) *Attorney, Agent, or Firm* — Paul Davis

(57) ABSTRACT

An electric vehicle includes a steering element that can include a handle bar element. A platform supports a ride of the electric vehicle. At least one front wheel and at least one rear wheel are included and coupled to the platform. An electric motor provides a mechanical power to at least one of the front and rear wheels. A battery housing removably receives and holds one or more battery packs, where the one or more battery packs are configured to power the electric vehicle. A camera is included.

11 Claims, 15 Drawing Sheets

(56) References Cited

U.S. PATENT DOCUMENTS

2021/0171144 A1* 6/2021 Champoux ................ B62J 3/14
2021/0284267 A1* 9/2021 Park ......................... B62J 27/00
2021/0349465 A1* 11/2021 Gillett ...................... B62J 99/00

FOREIGN PATENT DOCUMENTS

| CN | 105357483 A | * | 2/2016 |
| CN | 108422950 A | * | 8/2018 |
| CN | 212183606 U | * | 12/2020 |

* cited by examiner

ELECTRIC VEHICLE WITH ONE OR MORE CAMERAS

CROSS-REFERENCE TO RELATED APPLICATIONS

This application claims the benefit of U.S. Provisional Patent Application 63/030,927, filed on May 28, 2020.

BACKGROUND

Field of the Invention

The present invention relates to electrical vehicles, and more particularly to electric vehicles with one or more cameras.

Brief Description of the Related Art

Vehicular communications are a growing area of communications between vehicles and including roadside communication infrastructure. Advances in wireless communications are making possible sharing of information through real time communications between vehicles and infrastructure. This has led to applications to increase safety of vehicles and communication between passengers and the Internet. Standardization efforts on vehicular communication are also underway to make vehicular transportation safer, greener and easier.

One example of a Vehicular communication systems used computer networks in which vehicles and roadside units are the communicating nodes, providing each other with information, such as safety warnings and traffic information. They can be effective in avoiding accidents and traffic congestion. Both types of nodes are dedicated short-range communications (DSRC) devices. DSRC works in 5.9 GHz band with bandwidth of 75 MHz and approximate range of 300 m.[1] Vehicular communications is usually developed as a part of intelligent transportation systems (ITS).

One motivation for vehicular communication systems is safety and eliminating the excessive cost of traffic collisions. According to the World Health Organization (WHO), road accidents annually cause approximately 1.2 million deaths worldwide; one fourth of all deaths caused by injury. Also, about 50 million persons are injured in traffic accidents. If preventive measures are not taken road death is likely to become the third-leading cause of death in 2020 from ninth place in 1990, A study from the American Automobile Association (AAA) concluded that car crashes cost the United States $300 billion per year. It can be used for automated traffic intersection control.

SUMMARY

An object of the present invention is to provide an electric vehicle with one or more cameras.

These and other objects of the present invention are achieved in, an electric vehicle with a steering element that can include a handle bar element. A platform supports a ride of the electric vehicle. At least one front wheel and at least one rear wheel are included and coupled to the platform. An electric motor provides a mechanical power to at least one of the front and rear wheels. A battery housing removably receives and holds one or more battery packs, where the one or more battery packs are configured to power the electric vehicle. A camera is included.

DETAILED DESCRIPTION

Embodiments of the described technology provide electric scooters having top-swappable batteries. The batteries may be attached to the underside of the deck of the electric vehicle to form a removable deck assembly. The deck assembly may be removed from the top of the electric vehicle by operating a latch and lifting a handle of the assembly. The deck assembly may be returned to the electric vehicle in a similar manner.

In some embodiments, the battery may be electrically coupled to a motor of the electric vehicle by electrical cables and an electrical connector. The electrical connector may be a quick twist connector that is opened and closed by twisting its halves in opposite directions.

In some embodiments, instead of using electrical cables, the electric vehicle and deck assembly may include electrical connectors that mate when the deck assembly is installed in the scooter. The electrical connectors may be surrounded by cushions that protect the connectors from micro vibrations, dirt and water, and the like.

Figure 1:
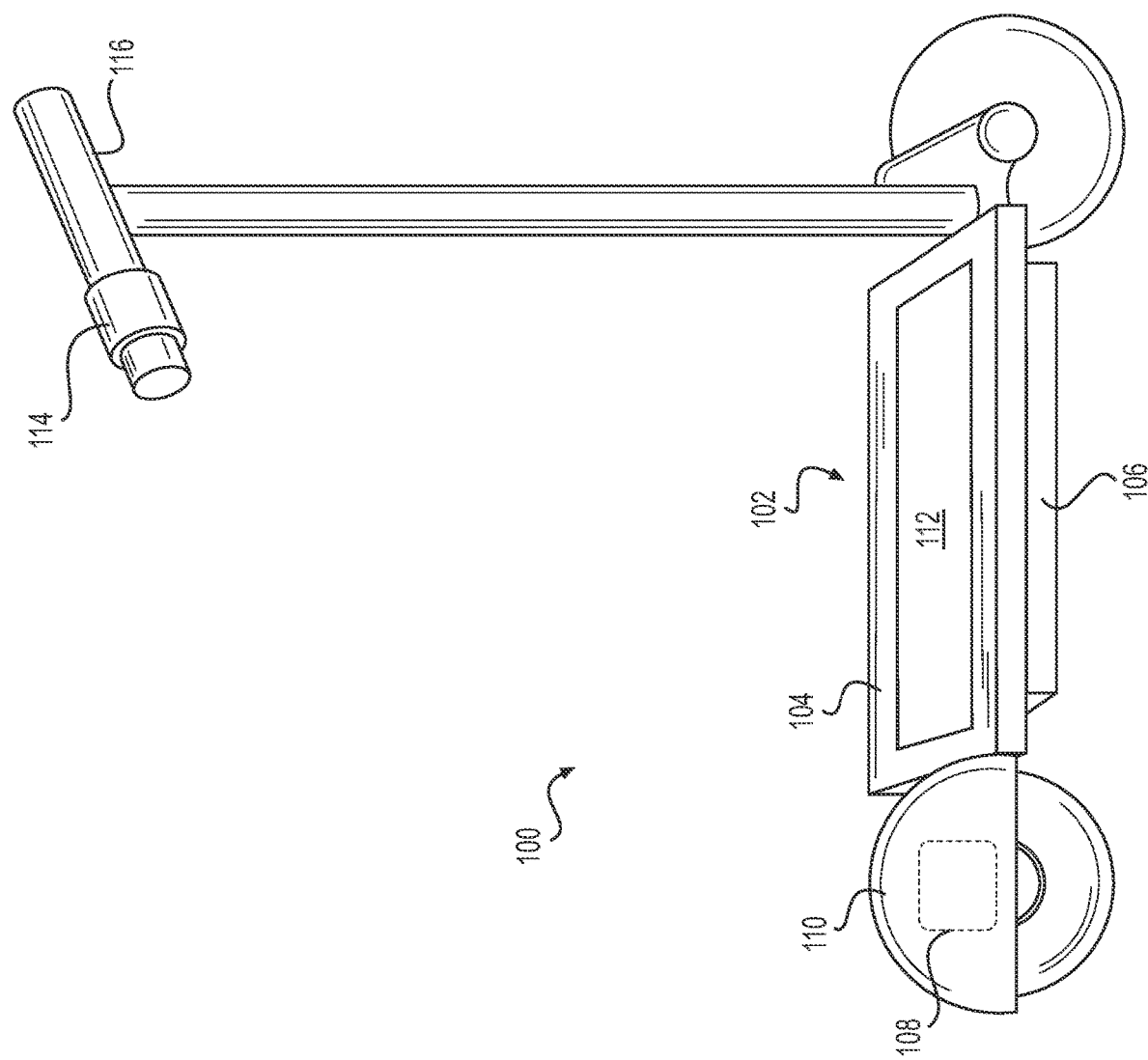
FIG. 1 illustrates an electric vehicle according to embodiments of the disclosed technology.

FIG. 1 illustrates an electric vehicle 100 according to embodiments of the disclosed technology. Referring to FIG. 1, the electric vehicle 100 includes a deck assembly 102 removably attached to a frame 104 of the electric vehicle 100. The deck assembly 102 includes a battery case 106 mounted underneath a deck 112. The battery case 106 includes one or more batteries (not shown). The batteries are electrically coupled to an electric drive motor 108, which is protected by a housing 110. The electric vehicle 100 may be steered by turning a handlebar 116. The speed of the motor 108 may be controlled using a throttle 114 mounted on the handlebar 116.

The electric vehicle 100 is depicted in FIG. 1 as having only two wheels. However, it will be appreciated that the disclosed technology applies to scooters having any number of wheels. Furthermore, it will be appreciated that the disclosed technology applies to vehicles other than scooters, and having any number of wheels.

Figure 2:
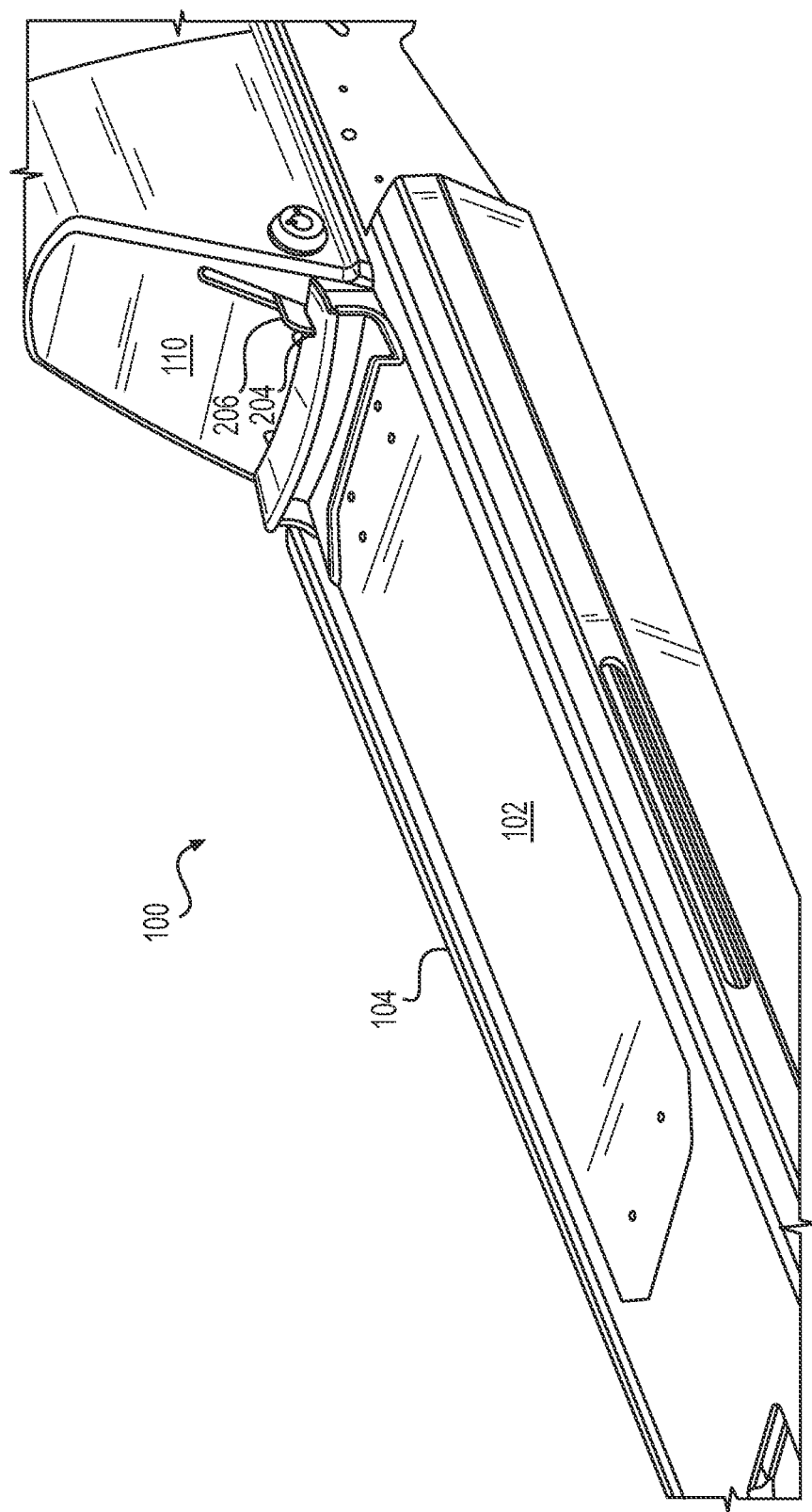
FIG. 2 illustrates further detail of the electric vehicle of FIG. 1.

FIG. 2 illustrates further detail of the electric vehicle 100 of FIG. 1. Referring to FIG. 2, the removable deck assembly 102 is held flush with the frame 104 by a latch 206 when engaged in a notch 204. The latch 206 may be controlled by a latch mechanism (not shown) disposed within the housing 110.

Figure 3:
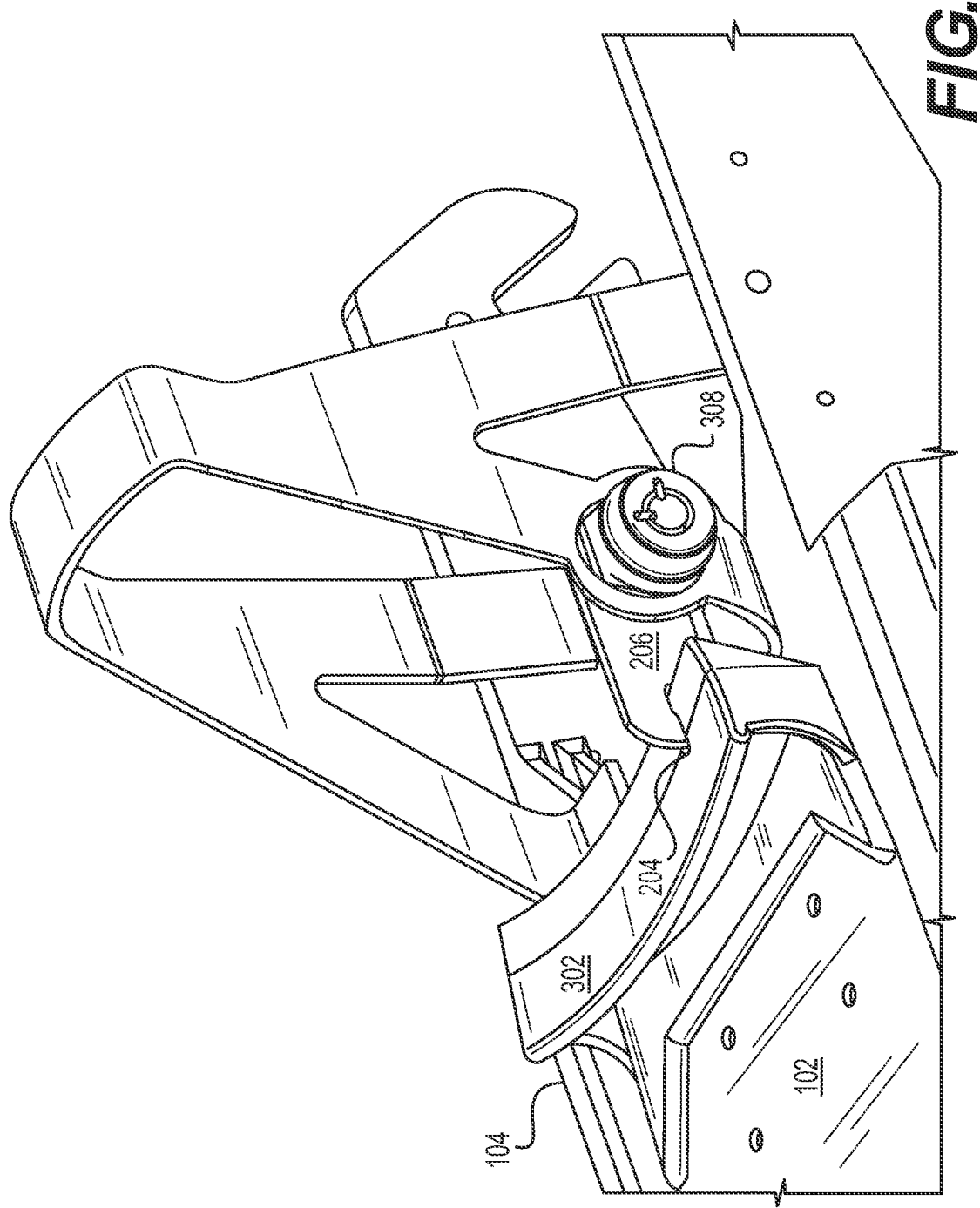
FIG. 3 illustrates further detail of the deck assembly and latch of FIGS. 1 and 2.

FIG. 3 illustrates further detail of the deck assembly 102 and latch 206 of FIGS. 1 and 2. Referring to FIG. 3, the deck assembly 102 may include a handle 302 to assist with the removal and installation of the deck assembly 102. The handle 302 may include a notch 204 to receive the latch 206. The deck assembly 102 may include a lock 308. The lock 308 may be operable to fix the latch 206 in an open position and/or a closed position, where the latch 206 secures the deck assembly 102 within the frame 104 when in the closed position. A key (not shown) may be inserted within lock assembly 308 to rotate the latch into, and out of, the notch 204, that is, between the closed position and an open position. When engaged with the notch 204, the latch retains the deck assembly 102 within the frame 104 of the electric vehicle 100.

In the depicted embodiment, the lock assembly 308 is implemented as a physical lock, to be used with a physical key. But in other embodiments, the lock assembly 308 may be implemented in other ways. For example, the lock assembly 308 may be an electronic lock, which may be operated using an electronic key, fob, remote control, or the like. In embodiments where security is not required, the lock in the lock assembly 308 may be replaced with a knob, a button, or another mechanism. In any case, the lock assembly 308 may be hidden or disguised. This feature is especially useful in a ridesharing fleet, where users should not operate the lock assembly 308, or remove the deck assembly 102.

Figure 4:
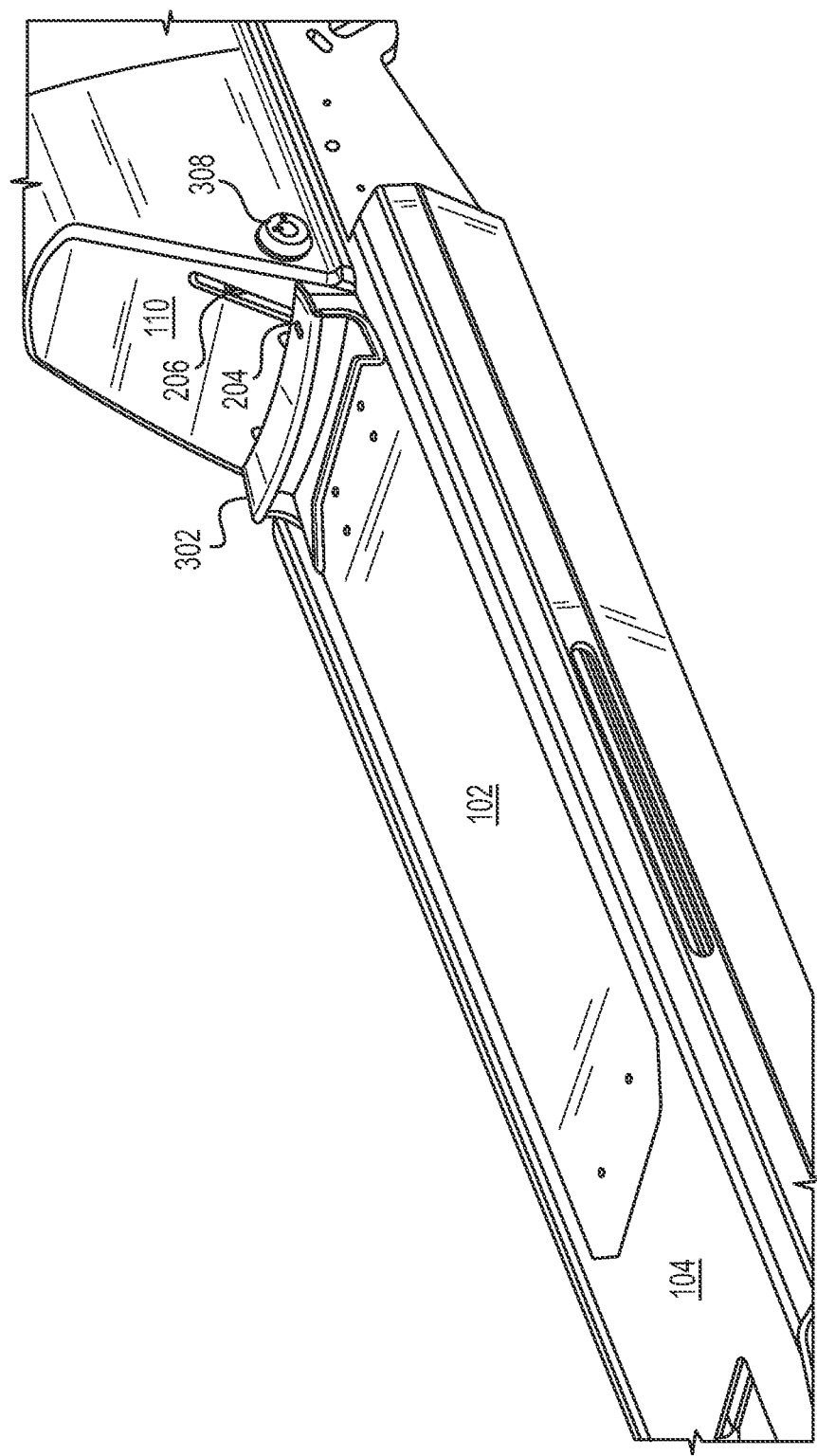
FIG. 4 illustrates detail of the electric vehicle of FIGS. 1 and 2 with the latch in an open position.

FIG. 4 illustrates detail of the electric vehicle 100 of FIGS. 1 and 2 with the latch 206 in an open position. Referring to FIG. 4, the lock assembly 308 has been operated to rotate the latch 206 out of the notch 204. To protect the user from the latch, the latch 206 has been rotated to a position within the housing 110. The deck assembly 102 may now be removed from the electric vehicle 100.

Figure 5:
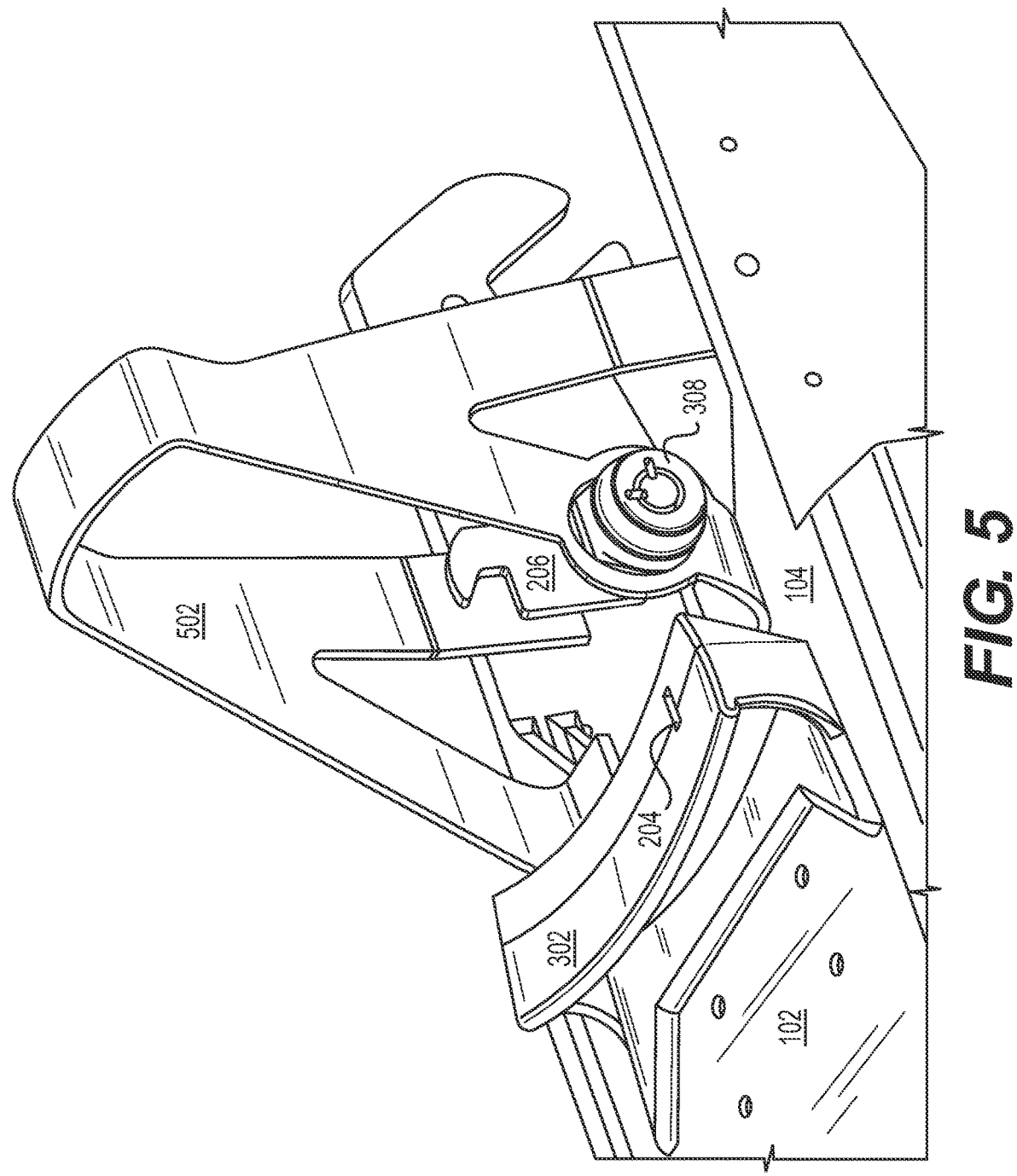
FIG. 5 illustrates further detail of the electric vehicle of FIGS. 1 and 2 with the latch in an open position.

FIG. 5 illustrates further detail of the electric vehicle 100 of FIGS. 1 and 2 with the latch 206 in an open position, and with the housing 110 removed. Referring to FIG. 5, the latch 206, and the lock assembly 308, are held in place by a strut 502 that is connected to the frame 104.

Figure 6:
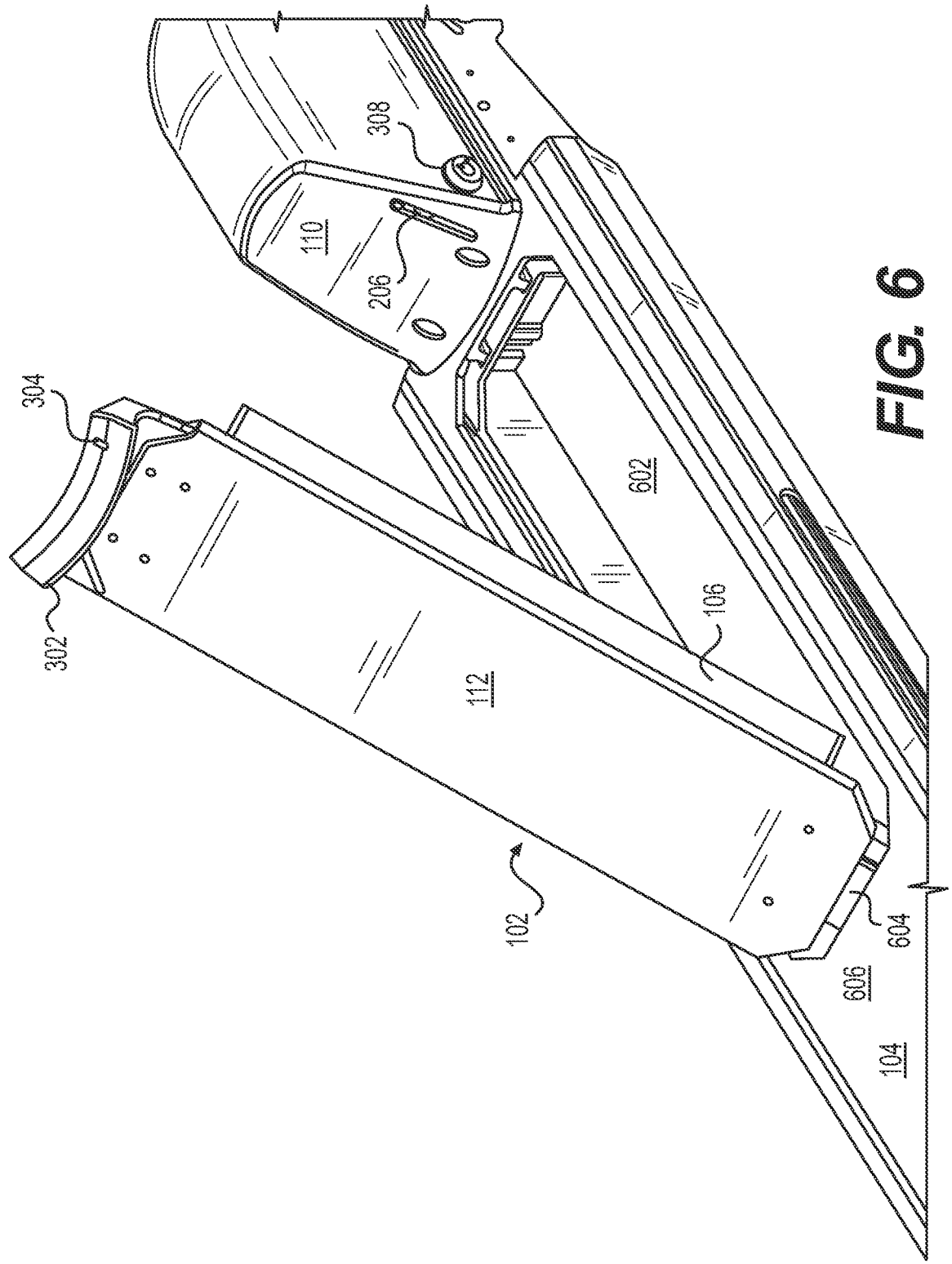
FIG. 6 illustrates detail of the electric vehicle of FIGS. 1 and 2 with the latch in an open position.

FIG. 6 illustrates detail of the electric vehicle 100 of FIGS. 1 and 2 during installation, or removal, of the deck assembly 102. Referring to FIG. 6, the frame 104 has an upper surface 606, and an opening 602 in the frame 104 is visible. The opening 602 is formed so as to receive the deck assembly 102 when the deck assembly 102 is lowered into the opening of the frame from above the upper surface 606 of the frame. As can be seen in FIG. 6, the deck assembly 102 includes a protruding tongue 604 at the front of the deck assembly 102. During removal of the deck assembly 102, a user may lift the deck assembly 102 out of the opening of the frame 104 from above the upper surface 606 of the frame 104 by pivoting the deck assembly 102 upward about the tongue 604 using the handle 302, and then slide the deck assembly 102 slightly to the rear of the electric vehicle 100 to disengage the tongue 604 from the frame 104. During installation of the deck assembly 102, a user may first insert the tongue 604 into the frame 104, pivot the deck assembly 102 downward into the opening 602 until flush with the frame 104, and then rotate the latch 206 into the notch 204 to secure the deck assembly 102 within the frame 104.

Also visible in FIG. 6 is the battery case 106. The battery case 106 may include one or more batteries (not shown), which may be cushioned with foam pads or similar materials. The battery case 106 may be integrated with the deck 112 to form the deck assembly 102, as noted above. The deck assembly 102 may be watertight to prevent damage to the batteries, and may be of automotive quality. This arrangement provides several advantages. In current designs, the battery case is mounted underneath a non-removable deck, for example using screws. In such designs, the batteries can only be removed by inverting the scooter, and unscrewing the battery case. During this process, the electric vehicle may be damaged, the battery case may be damaged, and the screws may be lost. Furthermore, the user must have a tool such as a screwdriver. In contrast, in the described embodiments, the batteries may be removed without tools, by simply operating the latch 206 and lifting out the deck assembly 102. No tools are required. The electric vehicle need not be inverted, and may remain on the ground, in a rack, or the like.

Other advantages are especially applicable to a fleet of shareable electric scooters. In current fleets, the scooters are generally collected each evening, and taken to a charging facility where the batteries are charged. The charged scooters are then returned to electric vehicle sharing locations the next morning. But in this arrangement, the scooters are unavailable for sharing while being charged. And this arrangement requires two trips per day: one trip to collect the scooters, and another trip to deploy them.

Embodiments of the disclosed technology solve both of these problems. With the disclosed removable deck assembly, the scooters need not be collected. Instead, only the deck assemblies may be collected. The scooters may be left in the sharing location, sharing racks, and the like. Furthermore, with a fleet of similar scooters, the deck assemblies are interchangeable. Therefore, an operator can replace a discharged battery pack with a fresh battery pack, requiring only one trip, and keeping the electric vehicle available while the discharged battery pack is recharged. And because the disclosed deck assemblies are much smaller than the scooters, many more scooters can be serviced by a single truck than with current arrangements. In addition, because the disclosed deck assemblies weigh less than the scooter, there is less likelihood an operator will be injured while lifting them.

Figure 7:
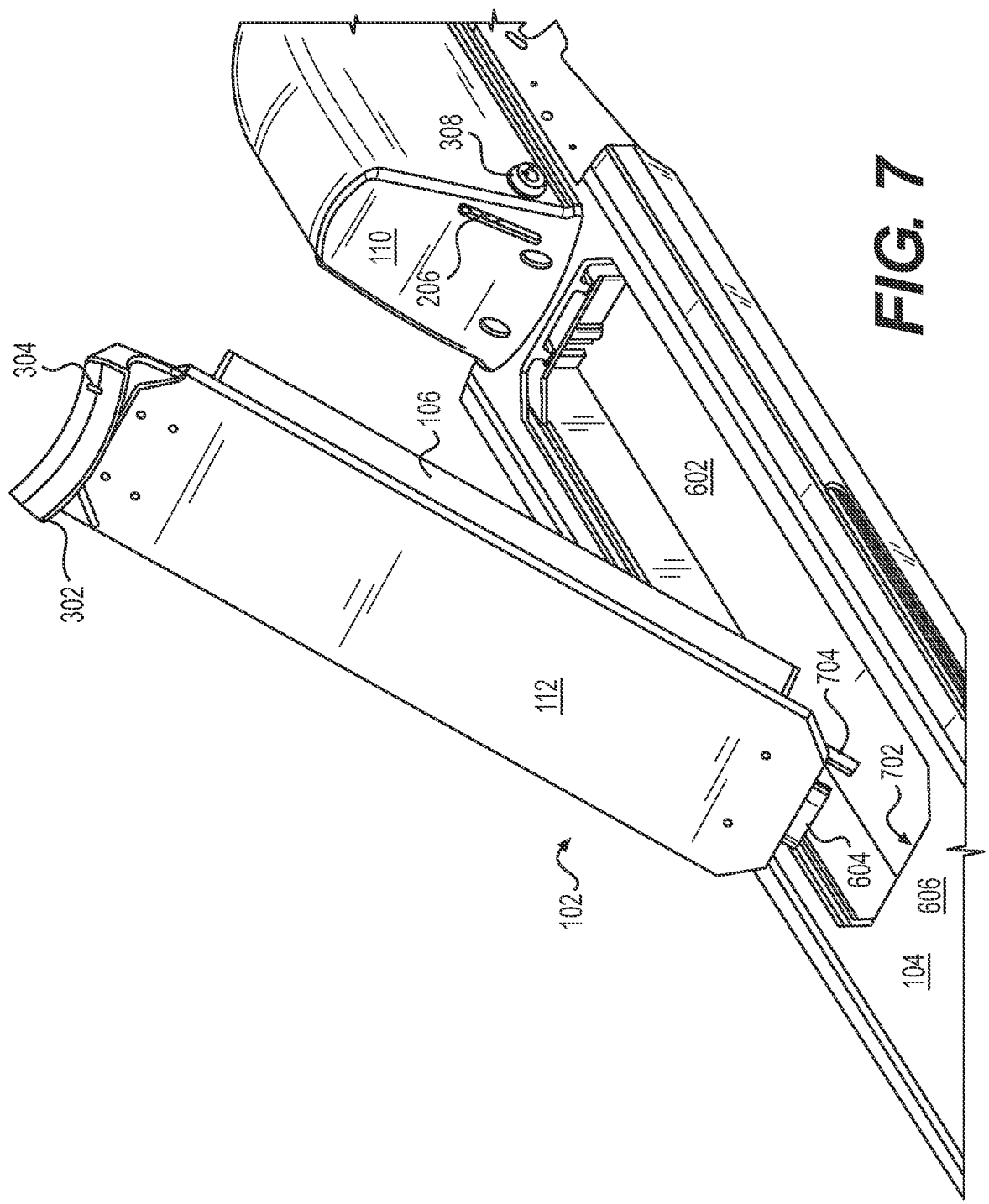
FIG. 7 illustrates further detail of the electric vehicle of FIGS. 1 and 2 during installation, or removal, of the deck assembly.

FIG. 7 illustrates further details of the electric vehicle 100 of FIGS. 1 and 2 during installation, or removal, of the deck assembly 102 Referring to FIG. 7, the tongue 604 of the deck assembly 102 is free of the frame 104. As can be seen in FIG. 7, the frame 104 may feature a double-wall construction for rigidity and light weight. In the disclosed embodiment, a slot 702 may be formed between the walls of the frame 104 to receive the tongue 604. Also visible in the embodiment of FIG. 7 is a portion of an electrical power cable 704. The power cable 704 may provide power to the motor 108 of the electric vehicle 100. To separate the deck assembly 102 from the electric vehicle 100, the user may operate a connector of the power cable 704, as described in detail below.

Figure 8:
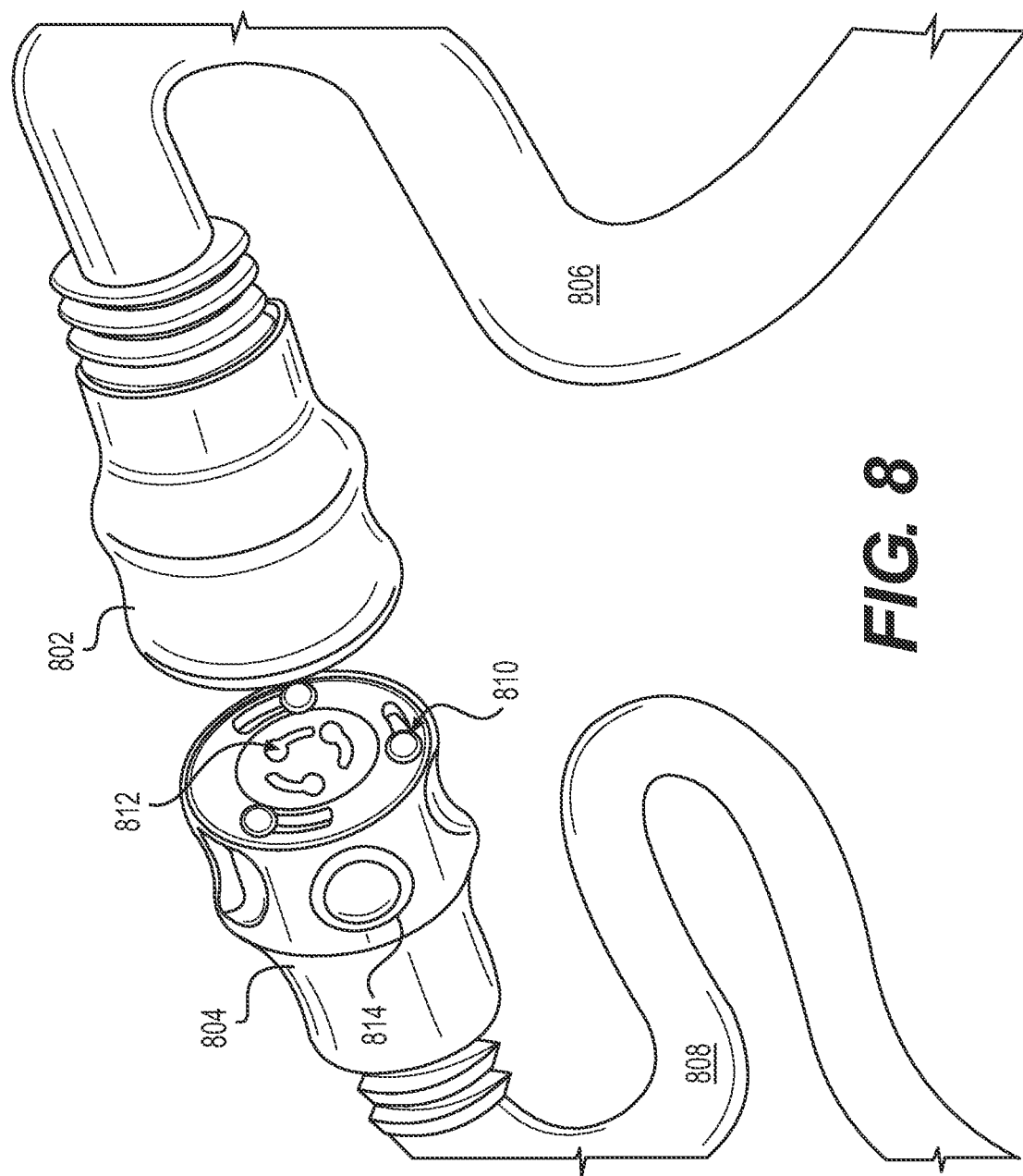
FIG. 8 illustrates a quick twist electrical soft connector according to embodiments of the disclosed technology.

FIG. 8 illustrates a quick twist electrical soft connector according to embodiments of the disclosed technology. As used herein, the term "soft connector" is used to refer to a connector having two halves, where at least one of the halves is coupled to a flexible electrical cable. In some embodiments, the term "soft connector" is used to refer to a connector where both halves of the connector are coupled to respective flexible electrical cables. As described below, the flexible cable(s) serve to insulate the electric vehicle from micro vibrations, a problem unique to vehicles such as scooters that have small, hard wheels. Referring to FIG. 8, the soft electrical connector includes a male half 802 and a female half 804. The halves 802, 804 are formed at the ends of electrical cables 806, 808, respectively. The illustrated soft connector is a quick twist connector that is opened and closed by twisting its halves 802, 804 in opposite directions. Accordingly, the female half 804 of the soft connector includes a plurality of curved slots 810, each including a round opening to receive a respective locking pin (not shown) of the male half 802. The electrical connectors may be implemented in a similar manner, as shown at 812.

In some embodiments, one half of the soft connector may include a locking indicator 814. The locking indicator 814 may shine red until the soft connector is completely closed, whereupon the indicator 814 may switch to green to indicate a positive lock of the soft connector.

One advantage of the disclosed quick twist electrical soft connector is that it mitigates the problem of micro vibrations. Vehicles such as automobiles and bicycles are subject to vibrations caused by imperfections in the road surface. Vehicles with small, hard wheels, such scooters, are subject to these vibrations, and also to micro vibrations, which are caused by tiny imperfections in the road surface, for example such as the pebbles in a conglomerate road surface. Electrical connectors in particular are adversely affected by micro vibrations, which cause the mating electrical parts to rub together and thereby deteriorate. Gold plating on electrical connectors is particularly subject to this deterioration. In the disclosed embodiments, the lengths of electrical cables 806, 808 isolate the electrical connector from these micro vibrations, greatly reducing any wear the electrical connectors 812 experience.

Another advantage of the disclosed quick twist electrical soft connector is that it encourages users not to pull on the cables 806, 808 to open the soft connector. In conventional electrical connectors with no twist lock mechanism, users may be tempted to pull on the cables to open the connector. This abuse may shorten the life of the electrical cable and electrical connector considerably. But this is not possible with the twist connector. The user must grasp the soft connector halves in order to twist them in opposite directions. Consequently, the electrical soft connector and electrical cables 806, 808 may enjoy a longer lifespan.

Figure 9:
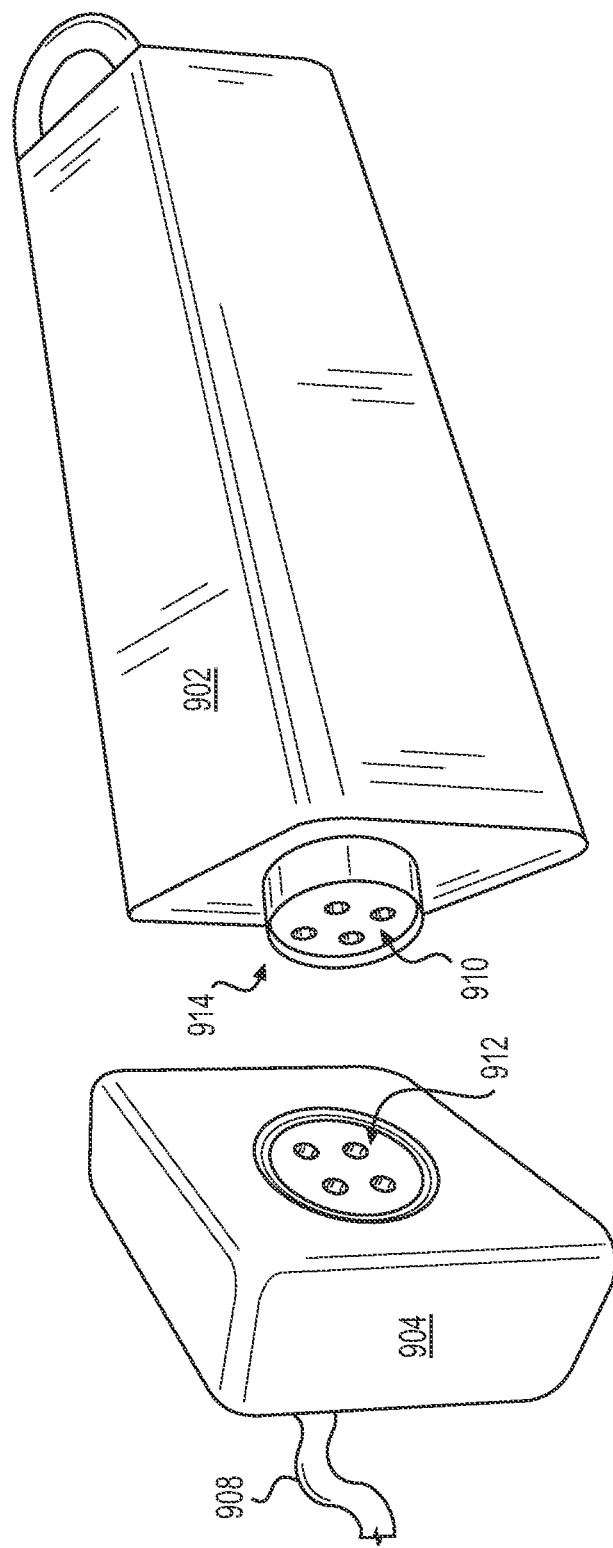
FIG. 9 illustrates a cushioned electrical connector according to embodiments of the disclosed technology.

FIG. 9 illustrates a cushioned electrical connector according to embodiments of the disclosed technology. Referring to FIG. 9, a deck assembly 902 that includes a battery pack may be pressed against an elastic mounting block 904 during installation. The deck assembly 902, and the mounting block 904, include respective electrical connectors 910, 912 that are mated during installation of the deck assembly 902, thereby providing power from the battery pack to the motor through an electrical power cable 908. The mounting block 904 may be fabricated of an elastic material such as rubber to cushion the electrical connectors 910, 912 from micro vibrations. In the embodiment of FIG. 9, the elastic mounting block 904 is disposed upon the scooter.

But in other embodiments, an elastic mounting block may be disposed on the deck assembly 902 instead, or as well. For example, as shown in FIG. 9, the deck assembly 902 may include a second elastic mounting block 914 to further isolate the electrical connectors 910, 912 from micro vibrations. These elastic mounting blocks 904, 914 may also form a seal about the electrical connectors 910, 912 that protects the electrical connectors 910, 912 from water, dirt, and the like.

Figure 10:
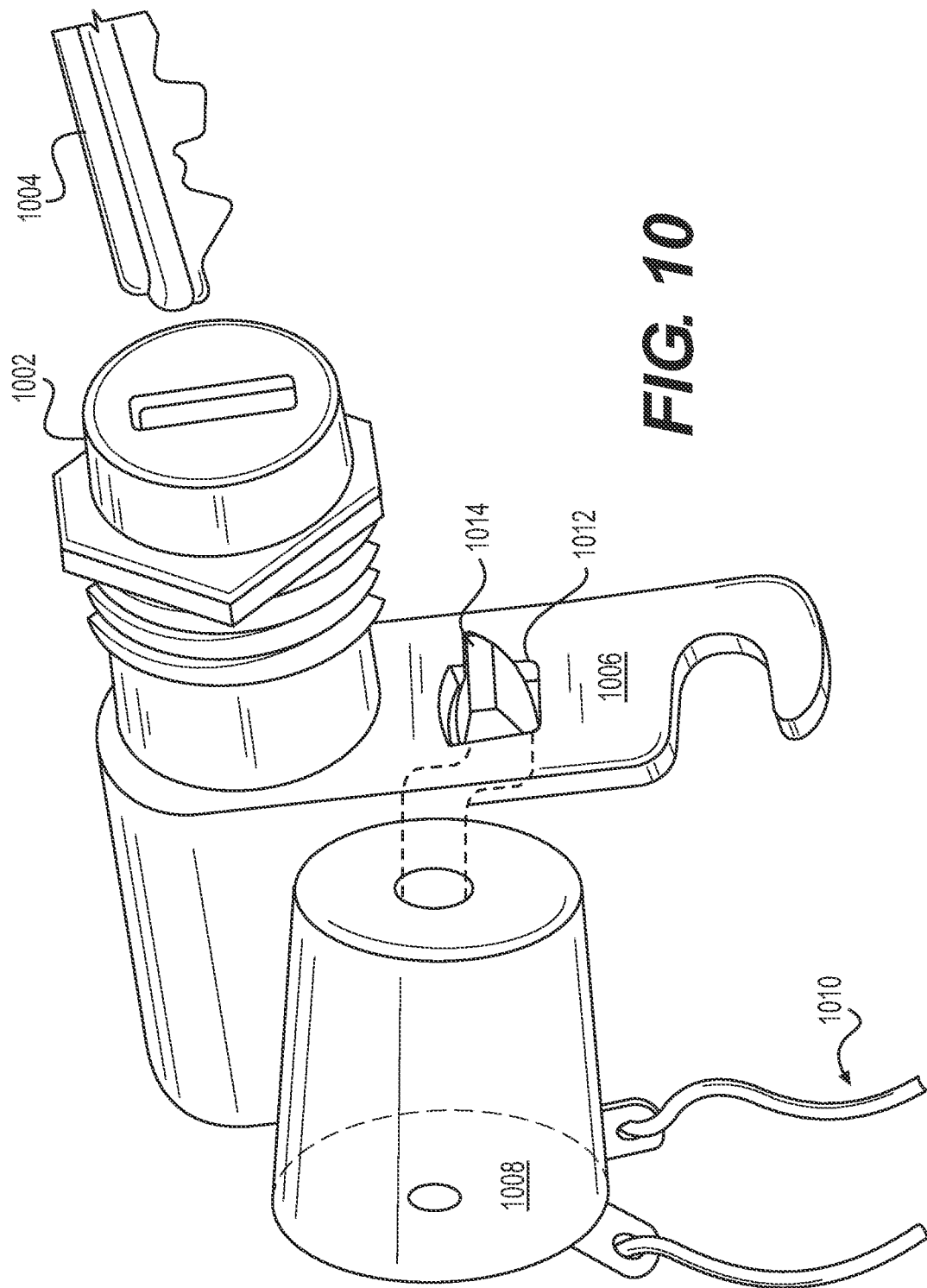
FIG. 10 illustrates a compound locking assembly according to embodiments of the disclosed technology.

FIG. 10 illustrates a compound locking assembly according to embodiments of the disclosed technology. Referring to FIG. 10, the compound locking assembly includes a mechanical lock 1002, which may be operated by a physical key 1004 to rotate a latch 1006 into a corresponding notch, such as notch 204 in handle 302 of deck assembly 102, as shown in FIG. 3.

Referring again to FIG. 10, the compound locking assembly may also include an electric lock 1008, which may receive power through electrical cables 1010, and which may be operated using an electronic key, fob, remote control, or the like. When operated, the electric lock 1008 may insert a tab 1014 into an opening 1012 formed in the latch 1006 of the mechanical lock 1002, thereby preventing operation of the mechanical lock 1002.

In some embodiments, the electric lock 1008 may operate in parallel with the mechanical lock 1002. In such embodiments, the electric lock 1008 may insert the tab 1014 into a notch in the deck assembly. In such embodiments, both locks 1002, 1008 must be opened to release the deck assembly.

In some embodiments, the tab 1014 of the electrical lock 1008 may have multiple stops. In one of the stops, the tab 1014 engages the latch 1006 of the mechanical lock 1002, thereby preventing its operation, as illustrated in FIG. 10. In another of the stops, the tab 1014 engages a notch in the deck, thereby preventing its removal, as described above. In still another one of the stops, the tab 1014 engages neither the latch 1006 nor the deck assembly, thereby permitting operation of the mechanical lock 1002, and removal of the deck assembly.

Figure 11:
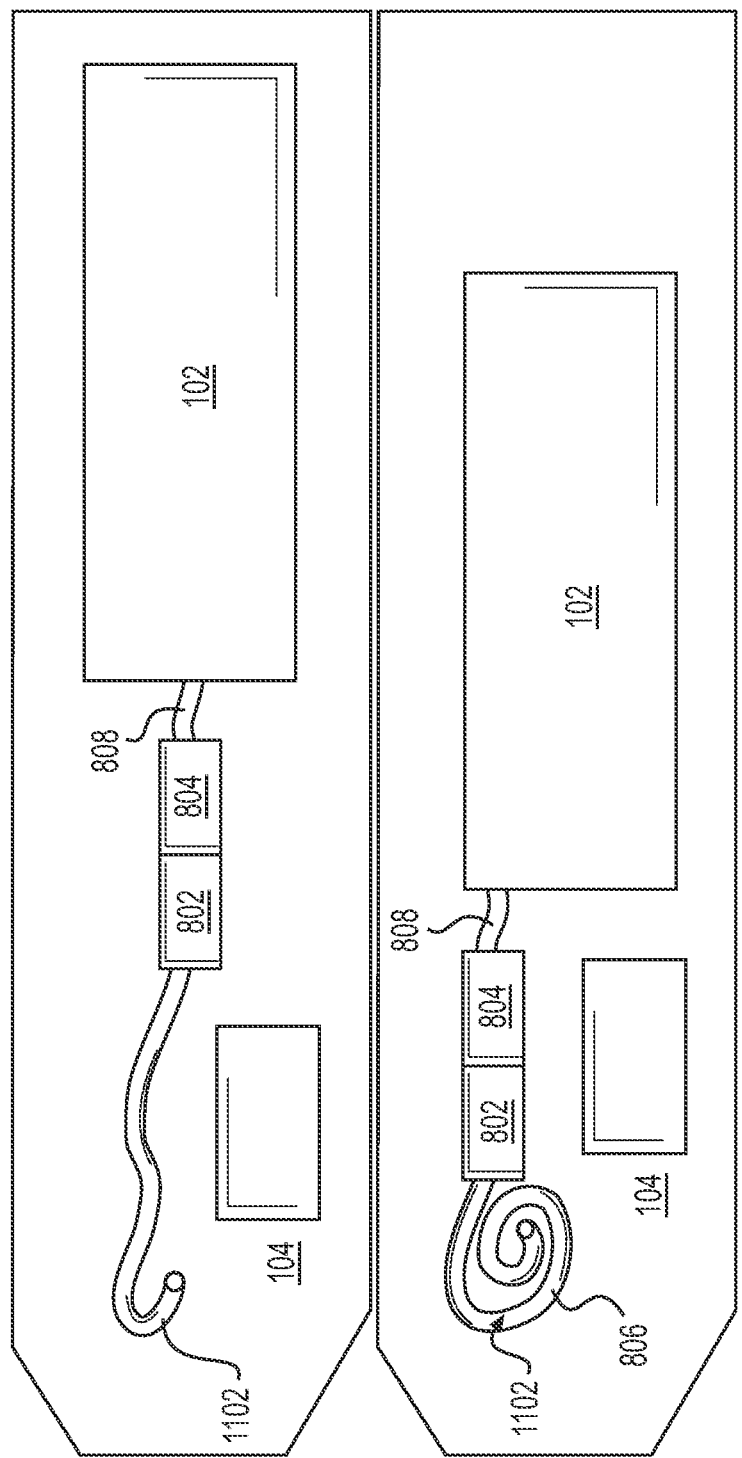
FIG. 11(a) illustrates a portion of the electric vehicle during removal or installation of the deck assembly.
FIG. 11(b) illustrates the retention device for the loose portions of the electrical cables of the scooter.

In embodiments that include an electrical power cable, the electric vehicle may include a mechanism to retain and protect the cable when the deck assembly is installed. FIGS. 11A, B illustrate one such mechanism according to embodiments of the disclosed technology. In FIGS. 11A, B the mechanism is illustrated for the electrical cables 806, 808 and electrical connector 802, 804 of FIG. 8. However, the mechanism may be employed with any electrical cable and electrical connectors.

FIGS. 11A, B are top views of the scooter, with the rear of the electric vehicle at the left. FIG. 11A illustrates a portion of the electric vehicle 100 during removal or installation of the deck assembly 102. The battery pack in the deck assembly 102 is electrically coupled to the motor 108 by the electrical cables 806, 808 and the electrical connectors 802, 804. As shown in FIG. 11A, during installation or removal of the deck assembly 102, one or both of the electrical cables 806, 808 are extended to facilitate installation and removal, and to provide easy access to the electrical connectors 802, 804. A retention device 1102 permits this extension of the electrical cables 806, 808.

When the deck assembly 102 is installed in the frame 104 of the electric vehicle 100, the retention device 1102 retracts, guides, organizes, and stores the loose portions of the electrical cables 806, 808, as shown in FIG. 11B. For example, the electrical cables 806, 808 may be retracted into a channel (not shown) formed in the frame 104 of the electric vehicle 100. The retention device 1102 may be implemented as a spring-loaded device, for example such as a winding mechanism or the like. The winding mechanism may be similar to that used in spring-loaded tape measures, with the electrical cables 806, 808 taking the place of the tape. One benefit of this mechanism is that a technician working on the electric vehicle does not have to manually feedback the slack in the electrical cables 806, 808, that results from the removal of the battery pack. When retracted, the electrical cables 806, 808, and the electrical connectors 802, 804, are protected from pinching, wear, and the like.

Figure 12:
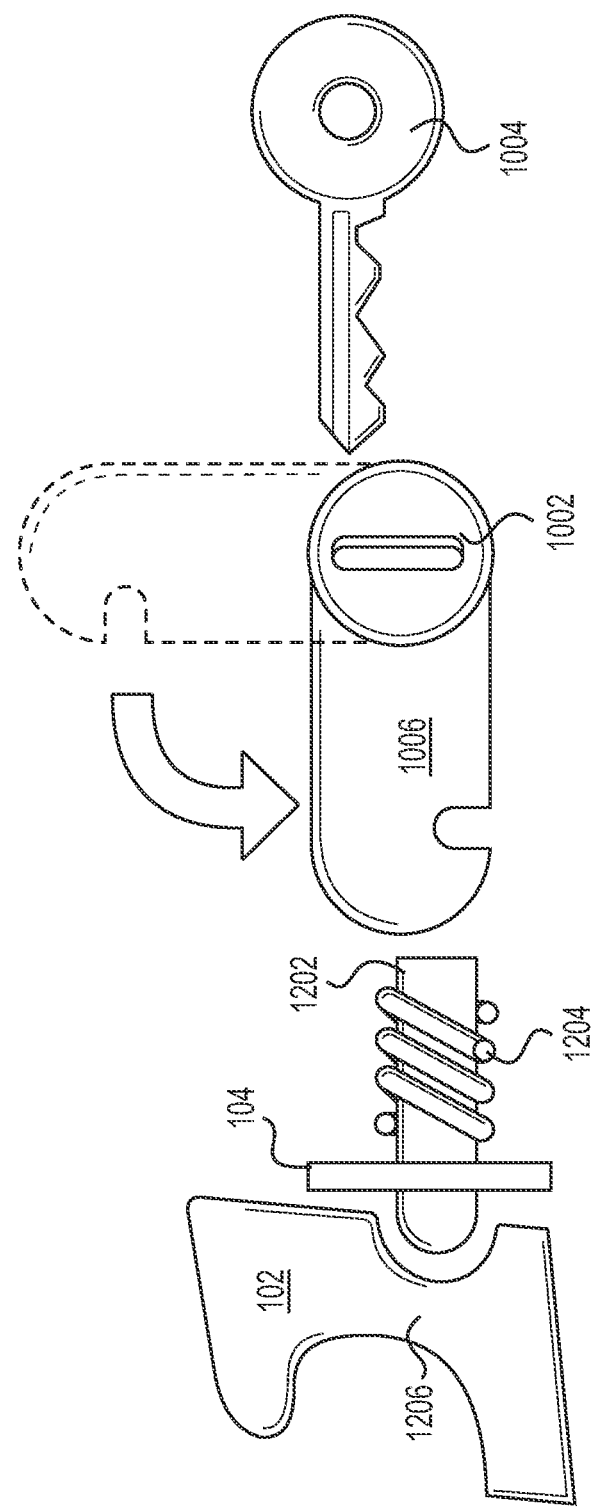
FIG. 12 illustrates a hidden latch mechanism for the scooter.

In some embodiments, the latch that retains the deck assembly 102 within the frame 104 of the electric vehicle 100 may be hidden within a structure such as the frame 104 or the housing 110 of the electric vehicle 100 so that it cannot be seen, and to protect the latch from damage. One such embodiment is illustrated in FIG. 12. The embodiment of FIG. 12 is illustrated for the mechanical lock 1002, physical key 1004, and latch 1006 of FIG. 10. However, the described embodiment may be employed with any lock, key, and latch, or with a keyless latch where the lock and key are replaced by a knob or the like.

Referring to FIG. 12, the described embodiment also includes a pin 1202 and a spring 1204 that biases the pin 1202 against the frame 104. When the lock 1002 and key 1004 are used to rotate the latch 1006 downward into a locked position, the latch 1006 forces the pin 1202 through a hole in the frame 104 into a notch 1206 formed in the deck assembly 102, thereby retaining the deck assembly 102 within the frame 104. When the lock 1002 and key 1004 are used to rotate the latch 1006 upward into an unlocked position, the spring 1204 backs the pin 1202 out of the notch 1206 so the deck assembly may be removed.

Figures 13, 14:
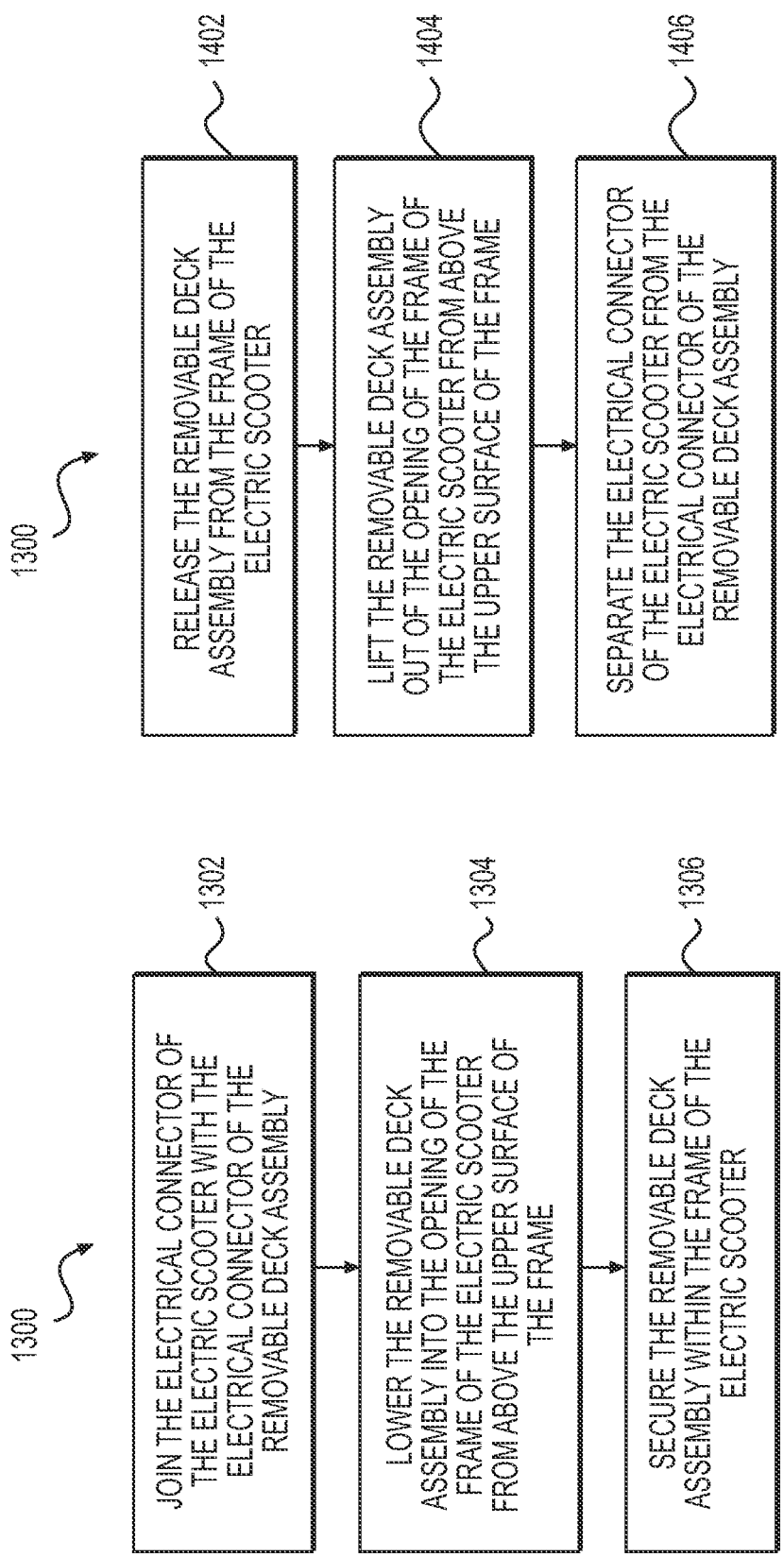
FIG. 13 illustrates a process for a user to install a removable deck assembly into an electric vehicle according to embodiments of the disclosed technology.
FIG. 14 illustrates a process for a user to remove a removable deck assembly from an electric vehicle according to embodiments of the disclosed technology.

FIG. 13 illustrates a process 1300 for a user to install a removable deck assembly into an electric vehicle according to embodiments of the disclosed technology. While elements of the process 1300 are described in a particular sequence, it should be understood that certain elements of the process 1300 may be performed in other sequences, may be performed concurrently, may be omitted, or any combination thereof.

Referring to FIG. 13, the user may join the electrical connector of the electric vehicle with the electrical connector of the removable deck assembly, at 1302. The connectors may be joined as described above. The user may lower the removable deck assembly into the opening of the frame of the electric vehicle from above the upper surface of the frame, at 1304, for example as described above. The user may secure the removable deck assembly within the frame of the electric scooter, at 1306, for example as described above.

FIG. 14 illustrates a process 1400 for a user to remove a removable deck assembly from an electric vehicle according to embodiments of the disclosed technology. While elements of the process 1400 are described in a particular sequence, it should be understood that certain elements of the process 1400 may be performed in other sequences, may be performed concurrently, may be omitted, or any combination thereof.

Referring to FIG. 14, the user may release the removable deck assembly from the frame of the electric scooter, at 1402, for example as described above. The user may lift the removable deck assembly out of the opening of the frame of the electric vehicle from above the upper surface of the frame, at 1404, for example as described above. The user may separate the electrical connector of the electric vehicle from the electrical connector of the removable deck assembly, at 1406 for example as described above. Spatially relative terms such as "under," "below," "lower," "over," "upper," and the like, are used for ease of description to explain the positioning of one element relative to a second element. These terms are intended to encompass different orientations of the device in addition to different orientations than those depicted in the Figures. Further, terms such as "first," "second," and the like, are also used to describe various elements, regions, sections, etc. and are also not intended to be limiting. Like terms refer to like elements throughout the description.

Figure 15:
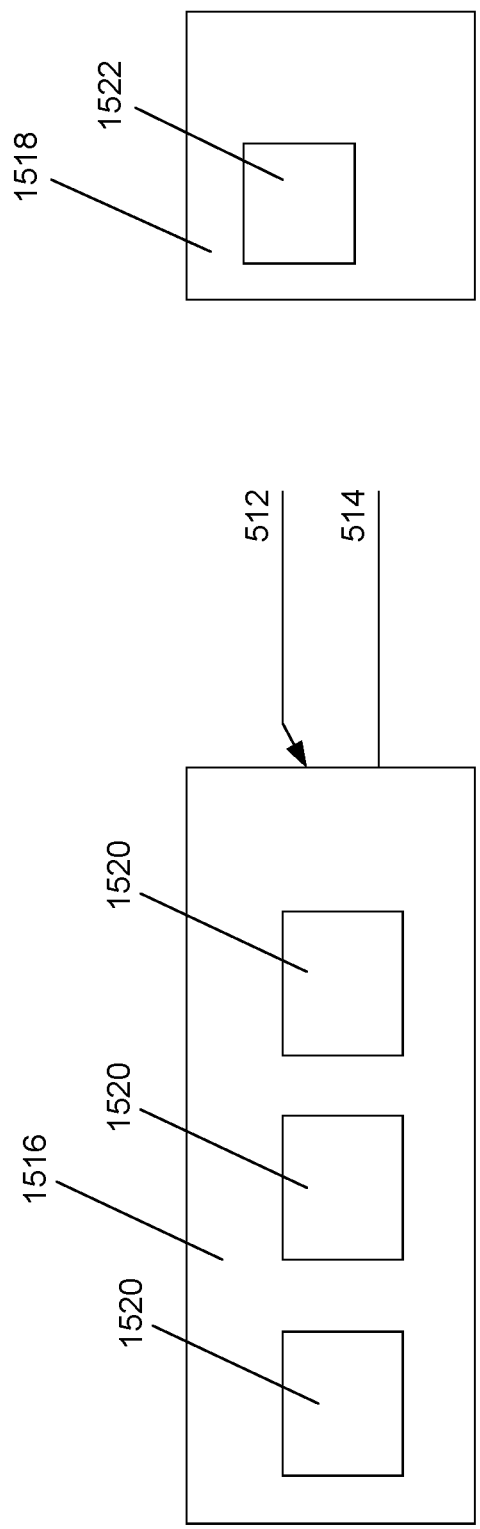
FIG. 15 illustrates one embodiment of an electric vehicle with public and private keys, and vehicle to vehicle communication.

In one embodiment, illustrated in FIG. 15, electric vehicles 1516 are provided with systems and methods for vehicle security without a hardware secure element 1510. Hardware secure elements 1510 usually allow for the storage of private keys 1512, which are used to sign and encrypt data. In one embodiment the present invention removes the dependency on a hardware secure element 1510 as part of the whole security system.

Private keys and private key pairs (collectively 1512 and 1514) are used to cryptographically secure sensitive information. Private keys 1512 can be used to decrypt, encrypt, or sign data. The corresponding public key 1514 can be used to decrypt or verify the signature of the data signed by its private key. Public keys cannot be used to encrypt or sign data.

As a non-limited example, as used herein a vehicle 1516 is a means of carrying or transporting something including but not limited to an EV motor vehicle 1516, including but not limited to a scooter, skateboard, skates, and the like.

As used herein an encryption key is a piece of information that determines the functional output of a cryptographic algorithm. For encryption algorithms, a key specifies the transformation of plaintext into ciphertext, and vice versa for decryption algorithms. Keys also specify transformations in other cryptographic algorithms, such as digital signature schemes and message authentication codes.

As used herein, the cloud 1518 is a global network of servers, each with a unique function. The cloud is not a physical entity, but instead is a vast network of remote servers around the globe which are hooked together and meant to operate as a single ecosystem. These servers are designed to either store and manage data, run applications, or deliver content or a service such as streaming videos, web mail, office productivity software, or social media. Instead of accessing files and data from a local or personal computer, you are accessing them online from any internet-capable device—the information will be available anywhere you go and anytime you need it. In the case of this embodiment the cloud 1518 is securely storing and generating public key and private key pairs for each component in the vehicle 1516.

As non-limiting examples, there are four different methods to deploy 8 resources.

These include: a public cloud 1518 that shares resources and offers services to the public over the Internet; a private cloud that isn't shared and offers services over a private internal network typically hosted on-premises; a hybrid cloud that shares services between public and private clouds depending on their purpose; and a community cloud 1518 that shares resources only between organizations, such as with government institutions.

In one embodiment, system 10 is coupled to the cloud 1518.

As used herein, a local area network (LAN) is a network that interconnects within a limited area such as a residence, school, laboratory, university campus or office building. By contrast, a wide area network (WAN) not only covers a larger geographic distance, but also generally involves leased telecommunication circuits. Ethernet and Wi-Fi are two common technologies in use for local area networks. Historical network technologies include ARCNET, Token ring, and AppleTalk.

As a non-limiting example, a wide area network (WAN) is a network that exists over a large-scale geographical area. A WAN connects different smaller networks, including local area networks (LANs) and metro area networks (MANs). This ensures that computers and users in one location can communicate with computers and users in other locations. WAN implementation can be done either with the help of the public transmission system or a private network.

As a non-limiting example, system 10 is coupled to the cloud. This can be achieved via GSM, WiFi, satellite, a mobile device and the like.

Other wireless standards that are specifically designed for IoT devices are becoming available such as LoRA, NB-IOT and LTE-M, and the like.

As a non-limiting example, in one embodiment one or more hardware elements 1510 of the vehicle 1516 has public keys 1514 stored therein. Secure encryption is not put on the hardware elements 1510.

A vehicle 1516 consists of one or more in individual components 1520. Individual components 1520 of the vehicle 1516 are given an Acton Unique Identifier (AUIDs). When a vehicle 1516 is activated the first time, a unique public key 1514 and private key 1512 pair are generated by the cloud. AUIDs, public key and private keys 1514 and 1512 are then stored in the cloud. Each component stores its AUID and public key in persistent memory within the component thus eliminating theft of private keys 1512.

For selected components 1520 of the vehicle 1516, the cloud 1518 produces a unique private key 1512 and a public key 1514. As a non-limiting example, with the present invention, private keys 15112 are secure and in the cloud. They cannot be taken from the vehicle 1516. Non-limiting examples of vehicle 1516 components 1520 with public keys 1514 include but are not limited to: IOTA, the battery, motor controller, and the like.

As non-limiting examples, a simple electric vehicle 1516 can include a battery; vehicle control unit (motor controller), and IoT gateway. Each of these components 1520 is given an AUID. Additional components 1520 include but are not limited to vehicle locks; dashboards; helmets; docking stations; and the like.

As non-limiting examples, selected vehicle components 1520 have unique IDs with a unique identifier. These components 1520 are given a unique key pair. As a non-limiting example, the private key 1512 is securely stored in the cloud. An associated public key 1512 is stored in the vehicle components 1520. Communication in the cloud 1518 can be authenticated with the vehicle 1516 through the components 1520 that have public keys.

As a non-limiting example of authentication steps, public keys 1514 are passed to the vehicle 1516, e.g., vehicle components 1520. The private key 1512 is stored in the cloud, and the public key 1514 is transferred to a respective vehicle component.

As a non-limiting example, when the vehicle 1516 connects to the server 1522, it tells the server 1522 it has components 1520 A, B, and C. The System looks up in an associated database and generates an activation message composed of multiple parts, each part signed with the private key 1512 that corresponds to the AUID of the vehicle component A, B, or C 1510. When the activation message is received by the vehicle 1516, the individual components 1520 A, B, and C will decrypt and verify their parts of the message. If anyone component's message part fails verification, the vehicle 1516 will not activate.

As a non-limiting example, a secret key is not needed that unlocks the entire scoter. Instead, the system creates components 1520 are identified as being unique with associated keys.

In one embodiment fleets of vehicles are used to distribute information between vehicles in the fleet. As a non-limiting example, individual fleet vehicles have two wireless communication networks. The first is any kind of cloud 1518 connectively. The second one is any kind of local wireless communication.

When vehicles communicate with the cloud, they report their status occasionally. When they report status, they report the presence of other fleet-vehicles that they have detected on local wireless. As a non-limiting example, this status message can then be communicated with other fleet vehicles IDs that are within local communication. This provides information about the location of fleet vehicles, which can be used to reduce theft and increase fleet availability.

As a non-limiting example, data can be distributed to the fleet by seeding it to only certain vehicles, and these vehicles that receive the communications then communicate with other vehicles. Data that could be sent includes, but is not limited to updates, navigation information, vehicle configuration, secure one-time-keys. This mechanism decreases fleet-wide data-usage and improves fleet operation.

As a non-limiting example, a vehicle 1516 can detect, via local wireless communication, other vehicles, report their presence to the cloud, and the can then determine if another vehicle 1516 is located within a selected proximity. The cloud 1518 can then determine if the reporting vehicle 1516 can communicate data to the other vehicle. The cloud 1518 can then send a one-time use session key to the vehicles, allowing them to communicate securely.

When a vehicle 1516 communicates with the cloud 1518 that it sees another vehicle, it sends this message up to the cloud. The cloud 1518 can use this vehicle 1516 presence information to disable vehicles, track stolen vehicles, locate missing vehicles, and the like.

Fleet vehicles are vehicles operated by an entity that provides them for public or private use to individuals or employees. A fleet is a group of one or more Fleet Vehicles that an operator makes available for use. Private vehicles are vehicles operated by individuals for their own use.

In one embodiment, this invention can be used with both fleet and individual vehicles. If individual or fleet Operators of EV include their vehicle 1516 in this system, the benefits of lost vehicle 1516 discovery, reduced data usage, and the like can be extended across fleets and individuals. In this way, the fleet vehicles of Operator A can look for a stolen fleet vehicle 1516 of Operator B, while a private vehicle 1516 operated by individual C can receive software update data from Operator A's fleet.

When misplaced or stolen fleet or individual vehicles are located, the owner and/or authorities can be notified.

In one embodiment, one or more cameras are included with the electric vehicle 100. As non-limiting examples, the camera can include one or more of: 360 camera; action; animation; autofocus; backup; banquet; body; box; bridge; camcorder; phone; closed-circuit television; compact; compact system s; dashcam; digital; digital movie; digital single-lens reflex; disposable; document; field; firewire; folding; front-facing; gun; helmet; high-speed; hidden (spy); imago; instant; ip; keychain; large format; light-field; live-preview digital; medium format; mirrorless interchangeable-lens; monorail; movie; multiplane; omnidirectional; onboard; pin-hole; pin speck; plate; pocket; pocket video; point-and-shoot; polaroid; police body; pool safety; press; process; professional video; paratonic; rangefinder; red light; reflex; remote; rostrum; Schmidt; security; single-lens reflex; stat; stereo (3d); still; still video; subminiature; system; thermo-graphic; time-of-flight; toy; traffic; traffic enforcement; twin-lens reflex; video; view; webcam; wright; zenith; zoom-lens reflex; rangefinder; ultrasonic; and the like.

The term camera is also used for: devices producing images or image sequences from measurements of the physical world; or when the image formation cannot be described as photographic; IR; acoustic; magnetic resonance imaging; ultrasonography; virtual; and the like.

In one embodiment, a fleet of vehicles; with cameras or other detection devices is used to: locate roque vehicles; report a vehicle activities; safety; look for other vehicles; use a camera or other vehicle detection device to determine if a vehicle is parked appropriately; how it is used; driven; capture who a vehicle operator operates the vehicle; determine safety of driving or operation; determining where the vehicle is operated, e.g., in a bicycle zone; determining a difference between the bump patters by camera; differences between vehicle operation on a sidewalk or a road; bump patters; vehicle operation in handicapped crosswalks; detection of illegal activities; use in a surveillance fleet; and the like.

As a non-limiting example, there can be a tradeoff between power and performance such as power consumption. In one embodiment, a high-performance camera is used, a camera is utilized with a wider view of lenses rather than pixel count and the like. Reducing pixel count increases power savings. As a non-limited example file is selected over resolution. In another embodiment the field of view is optimized.

A variety of batteries can be used, including but not limited to higher density batteries, e.g., lithium ion, configured to hold more charge. Improvements to lithium ion batteries are made to reduce internal resistance and increase a battery's overall life. In one embodiment, a protective nano-sphere layer on the lithium anode moves with the lithium as it expands and contracts.

In one embodiment, solid state batteries are used. As a non-limiting example, these can have a different internal composition comprising of dry or solid components. This construction provides several advantages: higher discharge current, better thermal and chemical stability, no worry of electrolyte leaks or fires (provided a flame-resistant electrolyte is used), extended lifetime, decreased need for bulky and expensive cooling mechanisms, and the ability to operate in an extended temperature range. Solid-state batteries can build off of the improvements made in other types of batteries. In one embodiment, solid state batteries are used with cells made of solid and "dry" conductive material.

Aluminum-ion batteries can be used and have an aluminum anode. Aluminum-ion batteries provide increased safety at a decreased cost over lithium ion batteries. Cyclability is improved by using an aluminum metal anode and a graphite cathode. This also offers significantly decreased charging time and the ability to bend.

Lithium-sulfur batteries (Li/S) can be used, and typically have a lithium anode and a sulfur-carbon cathode. They offer a higher theoretical energy density and a lower cost than lithium ion batteries.

Metal-air batteries can be used, and have a pure-metal anode and an ambient air cathode. As the cathode typically makes up most of the weight in a battery, having one made of air is a major advantage. There are many possibilities for the metal, but lithium, aluminum, zinc, sodium and the like.

In one embodiment, vehicles are provided with devices that reduce insurance costs, including devices that control speed and driver activities; monitoring and control of safety parameters; improved braking; and the like.

In one embodiment automatic dimming and tilting headlights are provided.

In various embodiment, the vehicle can include: voice commands; mechanics on wheels that can diagnose their own mechanical problems, research options and book repair and maintenance options; navigational maps overlaid with additional map for route selection, safest route, most scenic route; technology that monitors health of a vehicle driver; brain assistance such as brain-to-vehicle technology; intelligent dashboard that include augmented reality; and the like.

In one embodiment, a plurality of sensors can be provided for learning driver patterns, and the like. Sensors can be including for monitoring a vehicle's health. Suitable sensors include but are not limited to acoustic, sound and vibration; air-fuel ratio meter; front sensor; blind spot monitor; crankshaft position sensor; engine coolant temperature sensor; hall effect sensor; wheel speed sensor; airbag sensors; automatic transmission speed sensor; brake fluid pressure sensor; camshaft position sensor; cylinder head temperature gauge; crankshaft position sensor; engine crankcase pressure sensor; exhaust gas temperature sensor; fuel level sensor; fuel pressure sensor; knock sensor; light sensor; map sensor; mass airflow sensor; oil level sensor; oil pressure sensor; oxygen sensor (O2); parking sensor; radar sensor; speed sensor; throttle position sensor; tire pressure sensor; torque sensor; transmission fluid temperature sensor; turbine speed sensor; variable reluctance sensor; vehicle speed sensor; water-in-fuel sensor; wheel speed sensor; abs sensors; electric current; electric potential; magnetic; radio; environmental; weather; moisture; humidity; flow; fluid velocity; navigation instruments; position; angle; displacement; distance; speed; acceleration; optical; lighting, imaging; pressure; thermal; heat; temperature; proximity; presence; health monitoring sensors; microphones; Helmut detection; and the like.

In one embodiment, the vehicle can be used as a decentralized energy resource and provide new, controllable storage capacity and electricity supply that is useful for the stability of the energy system. In markets where regulation allows EVs to be used as a source of flexibility. An EV-to-grid (V2G) commercial hub can be used by selling frequency-regulation services for system balancing purposes to a transmission system operator.

Figure 16:
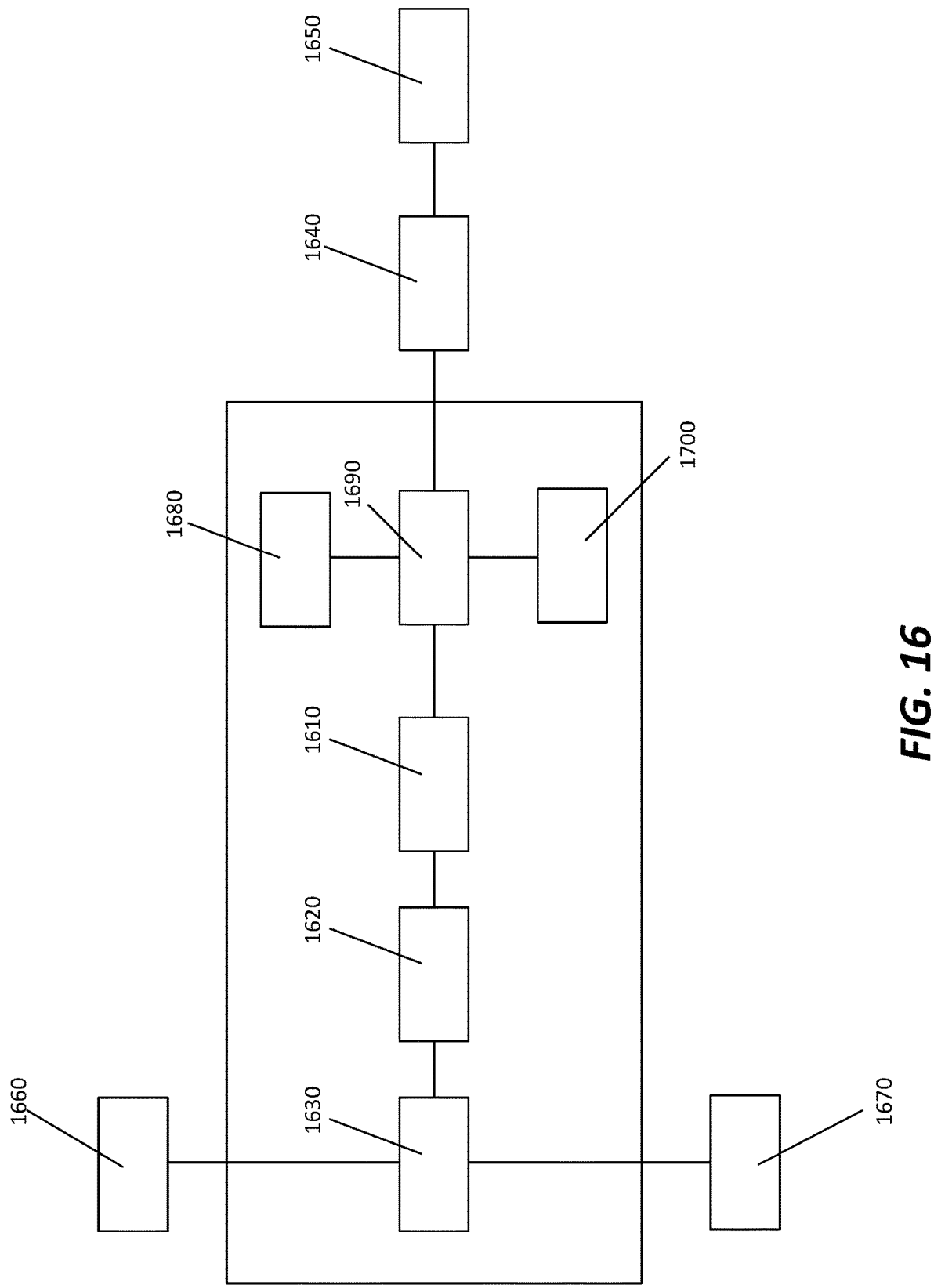
FIG. 16 illustrates one embodiment of an electric vehicle camera system of the present invention.

Referring to FIG. 16, and as a non-limiting example, electric vehicle 100 includes a system with an intrusion detection module 1610, a camera 1620, and a communication module 1630. In one embodiment the camera 1620 is connected with the intrusion detection module 1610 and the communication module 1630; the intrusion detection module 1610 is configured to detect whether a vehicle is invaded illegally, and control the camera 1620 to start when the vehicle is invaded illegally; the camera 1620 is configured to acquire an in-vehicle, including but not limited to an infrared image when being started, and send the in-vehicle image to the communication module 1630. In one embodiment, the communication module 1630 sends the image relative to the vehicle to the terminal 1640.

The communication module 1630 may send the image to the user terminal 1640, or send the in-vehicle infrared image to a server 1650.

In one embodiment, an engine control module 1660 is provided and can be coupled to the communication module 1630. The engine control module 1660 can stop the engine from running when the camera 1620 detects an event including but not limited to: theft, unauthorized movement, and the like.

As a non-limiting example, in response to a camera input, a start limiting instruction is provided and transmitted to the engine control module 1660 through the communication module 1630, The engine control module 1660 can control the engine to stop running after receiving the start limiting instruction, so as to prevent the vehicle from being stolen, and to control engine operation.

In one embodiment, camera 1620 is coupled to a positioning module 1670, and the positioning module 1670 is connected to the communication module 1630. As a non-limiting example, positioning is initiated upon receipt of a positioning instruction through the communication module 1630. As a non-limiting example, this provides vehicle position information to the user which can via a display, a terminal and the like.

In one embodiment, intrusion detection module, camera 1620 and a communication module are arranged in electric vehicle 100. As a non-limiting example, the intrusion detection module can be used to whether the electric vehicle is invaded illegally and controls the camera 1620 to start when the vehicle is invaded illegally. As a non-limiting example, the camera 1620 acquiring electric vehicle image information when the camera 1620 is started; and the communication module is used for sending images from the camera 1620 to a display 1640 that can be positioned at the electric vehicle 100, external to the electric vehicle, to an external terminal, and the like. When the electric vehicle 100 is invaded illegally, images relative to the electric vehicle 100 can be provided in time when the electric vehicle 100 vehicle is stolen, via images that are inconsistent normal operation of the electric vehicle 100. These images can be provided to policing authorities, to the vehicle operator and to the system 10 managing the electric vehicle. This can be achieved with camera 1620 along with communication module 1630, intrusion detection module 1610, engine control module 1660, positioning module 1670 and the like.

As a non-limiting example, camera 1620 is positioned at electric vehicle 100 in a manner such that: (i) an operator of the electric vehicle 100 does not interfere with operation of the camera 1620; (ii) the camera 1620 is able to provide unobstructed images; and the operator of the electric vehicle 100 does not damage the camera 1620; and the like. As a non-limiting example, the camera 1620 is installed on electric vehicle 100 at a variety of different locations, including but not limited to a front, back or side of electric vehicle 100, at the handlebars of the electric vehicle, and the like. The camera is positioned at electric vehicle 100 in a manner such that: (i) an operator of the electric vehicle 100 does not interfere with operation of the camera 1620; (ii) the camera 1620 is able to provide unobstructed images; and the operator of the electric vehicle 100 does not damage the camera 1620; and the like. As a non-limiting example, camera 1620 can positioned at an interior of electric vehicle 100, and an IOT box, centrally located where a handlebar of a scooter mounts, hidden in a black plastic housing/display, and the like.

The communication module 1630 may send the image to the user terminal 1640, or send the in-vehicle infrared image to a server 1650.

In one embodiment, an engine control module 1660 is provided and can be coupled to the communication module 1630. The engine control module 1660 can stop the engine from running when the camera 1620 detects an event including but not limited to: theft, unauthorized movement, and the like.

As a non-limiting example, in response to a camera input, a start limiting instruction is provided and transmitted to the engine control module 1660 through the communication module 1630, The engine control module 1660 can controls the engine to stop running after receiving the start limiting instruction, so as to prevent the vehicle from being stolen.

In one embodiment, camera 1620 is coupled to a positioning module 1670.

In one embodiment, camera 1620 includes a supervisory controller 210 and camera 1620. As a non-limiting example, when camera 1620 is coupled to communication module 1630, supervisory controller 1680 is used for controlling when camera 1620 starts recording, and can be used to manage the amount of energy that camera 1620 consumes.

In one embodiment, camera 1620 can determine a fatigue driving detection function for an electric vehicle operator.

As a non-limiting example, the monitoring controller 1690 can perform a face recognition 1700 on the image from camera 1620.

In one embodiment, the face feature information can perform face tracking to obtain a face region; and carry out face recognition on the face area to obtain face characteristic information.

In one embodiment, the intrusion detection module 1610 includes an anti-theft controller 1690.

In one embodiment, online machine learning is used with camera 100 to detect if vehicle operators are obeying traffic rules, including but not limited: speed; where the vehicle is operated; e.g., sidewalks; in high or low traffic areas; up or down hills; in low or high-speed areas; high or low traffic concentrations areas; and the like.

As non-limiting examples, camera 1620 can be used for insurance purposes. Camera 1620 can record certain information, start snapping photos send, that can be send to the cloud, and determine if there is an accident. As a non-limiting example, vehicle information is automatically uploaded when an incident is detected. In one embodiment, micro-mobility streams frames of pictures on a periodic bases, in order to save data. This optimizes data incident reporting. like every so often, 22 milliseconds, to save data. This is data optimized incident reporting.

In one embodiment, camera 1620 operates for an extended period, e.g., months or even years without maintenance. By looking at the energy requirements of camera 1620 over time, time-sliced energy cycling technology is used to distribute processing needed over time and location.

Power cycling is the act of turning a piece of equipment off and then on again. Reasons for power cycling include having an electronic device reinitialize its set of configuration parameters or recover from an unresponsive state of its mission critical functionality, such as in a crash or hang situation. Power cycling can also be used to reset camera activity. It can also be among the first steps for troubleshooting an issue.

Power cycling can be done manually, usually using a switch on the device to be cycled; automatically, through some type of device, system, or network management monitoring and control; or by remote control; through a communication channel.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An electric vehicle, comprising:
   a steering element that includes a handle bar element;
   a platform configured to support a rider of the electric vehicle;
   at least one front wheel and at least one rear wheel:
   an electric motor configured to provide a mechanical power to at least one of the front and rear wheels:
   a battery housing configured to removably receive and hold one or more battery packs, wherein the one or more battery packs are configured to power the electric vehicle; and
   a camera including a supervisory controller and coupled to a communication module, the supervisory controller controls when the camera starts recording, and manages an amount of energy that the camera consumes, the camera configured to determine a fatigue driving detection function for an electric vehicle operator of the electric vehicle;
   an intrusion detection module coupled to the communication module and the camera configured to detect whether the electric vehicle is invaded illegally;
   an engine control module coupled to the communication module configured to control an engine stop running after receiving
   a limiting instruction when a theft or unauthorized movement is detected;
   and a positioning module coupled to the communication module for positioning of the electric vehicle is initiated upon receipt of a positioning instruction through the communication module.

2. The vehicle of claim 1, wherein the camera is selected from one or more of: devices producing images or image sequences from measurements of the physical world; or when the image formation cannot be described as photographic; IR; acoustic; magnetic resonance imaging; ultrasonography; and virtual.

3. The vehicle of claim 1, wherein the camera is used to turn the motor on and off.

4. The vehicle of claim 1, wherein the camera is used for acquiring an image when the camera is started.

5. The vehicle of claim 4, wherein the image is sent to the communication module.

6. The vehicle of claim 5, wherein the communication module sends the image to an interface or a terminal.

7. The vehicle of claim 1, wherein the engine control module is configured to control the electric motor.

8. The vehicle of claim 1, wherein the supervisory controller configured to perform face recognition.

9. The vehicle of claim 8, wherein face recognition includes face feature information.

10. The vehicle of claim 8, wherein the face feature information is sent to the communication module.

11. The vehicle of claim 1, further comprising:
    a monitoring controller configured to perform face tracking on a camera image to obtain a face area and carry out face recognition on the face area.

* * * * *